June 10, 1930. J. MIHALYI 1,762,932
PROJECTION SYSTEM FOR COLOR PICTURES
Filed May 11, 1927
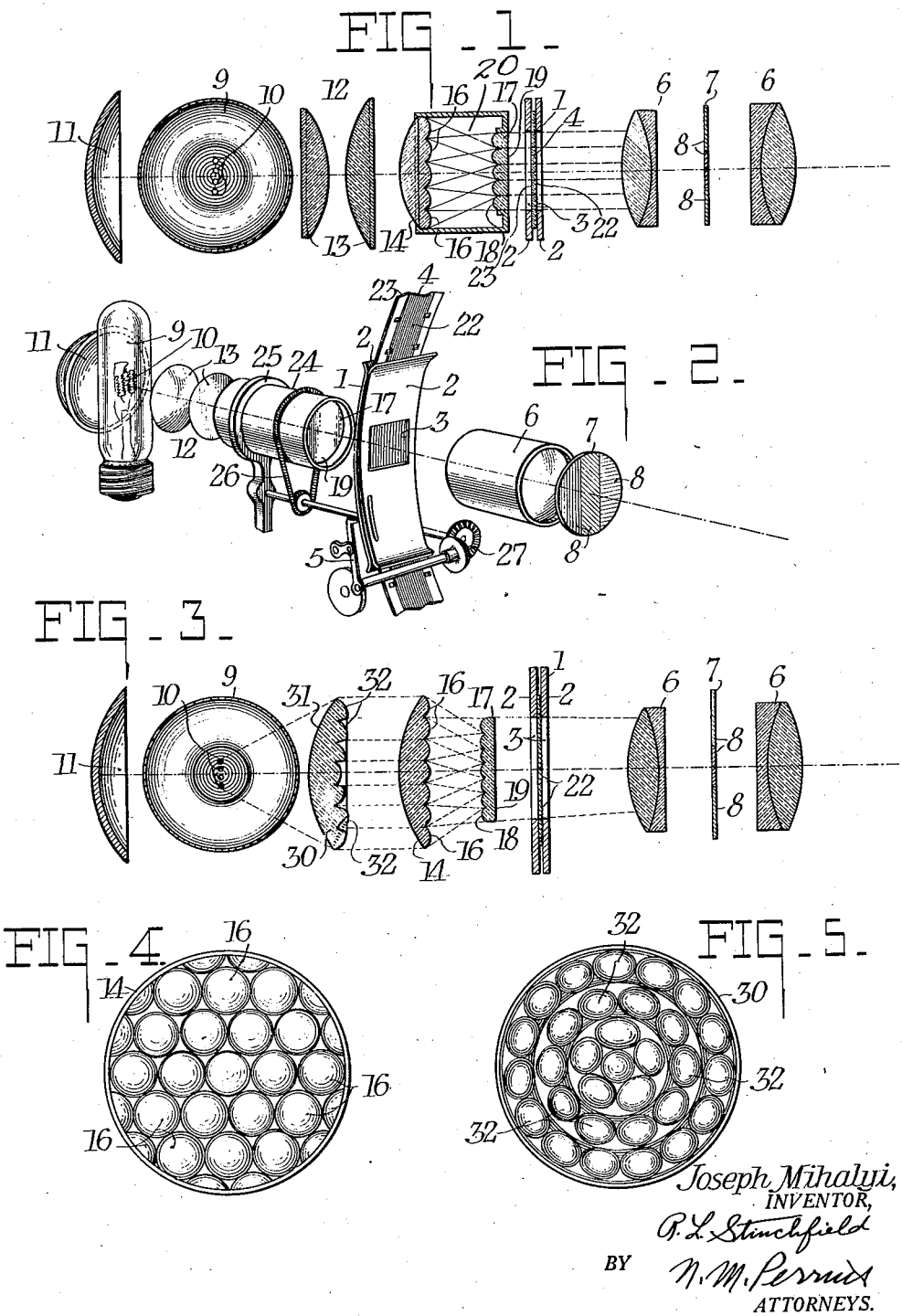
Joseph Mihalyi,
INVENTOR,
BY
ATTORNEYS.

Patented June 10, 1930

1,762,932

UNITED STATES PATENT OFFICE

JOSEPH MIHALYI, OF ROCHESTER, NEW YORK, ASSIGNOR TO EASTMAN KODAK COMPANY, OF ROCHESTER, NEW YORK, A CORPORATION OF NEW YORK

PROJECTION SYSTEM FOR COLOR PICTURES

Application filed May 11, 1927. Serial No. 190,509.

This application relates to a projector for color motion pictures and particularly to a projection system for use in connection with the process disclosed in the United States Patent, Berthon, 992,151, granted May 16, 1911.

This process involves the placing of a multicolor filter at the objective and the use of an element having lenticular protuberances on the surface facing the objective and carrying a photographic layer on the other surface.

The most available lamps for use in small portable projectors adapted to project pictures according to this process have long filaments. They are usually marketed in a definite form or design as in a series of parallel coils, which appear in use as parallel light bands.

In carrying out the process the images of these light bands are projected through the gate and the film thereat and focused at or near the filter. Unless the lamps are accurately adjusted, and sometimes even then, the images are of non-uniform brilliance and the color sections of the filter are not uniformly illuminated resulting in incorrect color balance in the projected picture.

If, however, instead of a single image of the filament covering the entire filter area, a multitude of small images are projected covering the area in a repeated pattern, the amount of light received by the filter sections will be correctly proportioned.

My invention relates to such a system as will be more fully disclosed hereinafter, reference being made to the accompanying drawing in which:

Fig. 1 is a diagrammatic plan of the projection system; and

Fig. 2 is a perspective view, diagrammatically shown, of the system with certain modifications;

Fig. 3 is a diagram of a different embodiment of my invention;

Fig. 4 shows the face of a condenser element adapted for use in my invention; and Fig. 5 shows the face of another condenser element.

The details of the mechanical structure are largely omitted not constituting a part of my invention and being unnecessary to an understanding thereof.

The usual projection gate 1 is provided, consisting of front and back plates 2 with registering windows 3, between which the film 4 is drawn by a pulldown mechanism shown conventionally at 5. In front of the gate and in optical alignment therewith is a projection objective 6 associated with which is a filter 7 consisting of color sections here shown as vertical color bands 8.

Behind the gate and in alignment therewith is a lamp 9 having the filament bands 10, and behind this is a mirror 11. Between the lamp and gate is a condenser system 12. As shown, this consists of two lenses 13 of usual form, a third lens element 14, the rear face 15 of which has one uniform curvature while the other face is formed in a series of small lenses 16 and a fourth element 17 also comprising a series of small lenses 18 on the rear surface, the other surface 19 being plane. These are carried in a suitable mount 24.

The effect of these numerous small lenses 16 is to bring to a focus in a plane at 20 between 14 and 17, a series of small images of the light source. The second series of small lenses 18 which correspond in number and position to the lenses 14 project the images 14 to form a corresponding series of images at or near the filter 7.

These small lenses are so numerous that each of the filter sections 8 will be illuminated by several of them and any inequalities in brightness in the light source will be reproduced to an equal extent in all of the colors, thus leaving the color ratio unaffected. At the same time the several beams of light as they pass the gate 1 give uniform illumination over the window 3, by which I mean that the illumination on the window will be sufficiently uniform to give satisfactory pictures on projection.

It is to be understood that the film used at the window is of the type described in the said Berthon patent and has numerous minute lenticulations on its front surface, here shown as in form of longitudinal ridges 22 and corresponding photographic images in the layer 23 on its rear surface.

In Fig. 2 the mount 24 in which the elements 14 and 17 are carried is supported rotatably in a journal 25, and is turned by friction belt 26 driven from the mechanism 27 of the projector. This will render the beams and the images therefrom even more uniform in their effective illumination of the gate and the window.

The system shown in Fig. 3 is similar to that of Fig. 1 except that, instead of the condenser elements 13, there is used an element 30 having a single convex surface 31 toward the lamp and the other surface formed in a series of ridges somewhat similar to a Fresnel lens, but with a series of individual lens surfaces 32 formed on the outer side of these ridges. Fig. 5 shows a face view of this element.

These correspond in number and location to the lens surfaces 16 and 18 and with them constitute systems for projecting parallel beams of light separately imaging the filament in the vicinity of the filter 7.

In each case the condenser system projects numerous small images of the filaments over the area of the filter, thereby avoiding incorrect color ratio caused by uneven illumination.

The size of the individual lenses 32, 16, and 18 preferably is of the order of from one-eighth to one-quarter of an inch in diameter and there are usually from fifteen to fifty in a set. These figures are given merely by way of illustration and are not intended to be limiting. These small lens surfaces are usually made by molding or pressing the glass and do not require a high degree of accuracy.

The cross-section of the film is on a much enlarged scale and the protuberances of the film are of a very much smaller order of magnitude.

The above described forms are by way of example and I contemplate as included within my invention all such modifications and equivalents as fall within the scope of the appended claims.

Having thus described my invention, what I claim as new and desire to secure by Letters Patent is:

1. In a projector, a projection gate, a projection objective in front of said gate, a filter comprising color sections also in front of the gate and associated with said objective, a light source behind the gate and positioned to throw a beam of light in a path through said gate, objective and filter, a condensing system in said path between the lamp and the gate and including a series of lens elements transversely of the beam and constituting a multiple projection system projecting a plurality of images of the light source over the area of the filter.

2. In a projector, a projection gate, a projection objective in front of said gate, a filter comprising color sections also in front of the gate and associated with said objective, a light source behind the gate and positioned to throw a beam of light in a path through said gate, objective and filter, a condensing system in said path between the lamp and the gate and including a series of lens elements transversely of the beam and constituting a multiple projection system projecting a plurality of images of the light source over the area of the filter, the gate being situated in a plane transverse of such beam removed from a focal plane thereof, whereby the illumination at the gate will be uniform.

3. In a projector, a projection gate, a projection objective in front of said gate, a filter comprising color sections also in front of the gate and associated with said objective, a light source behind the gate and positioned to throw a beam of light in a path through said gate, objective and filter, a condensing system in said path between the lamp and the gate and including a plurality of corresponding series of lens elements transversely of the beam and constituting a multiple projection system projecting a plurality of images of the light source over the area of the filter.

4. In a projector, a projection gate, a projection objective in front of said gate, a filter comprising color sections also in front of the gate and associated with said objective, a light source behind the gate and positioned to throw a beam of light in a path through said gate, objective and filter, a condensing system in said path between the lamp and the gate and including a plurality of corresponding series of lens elements transversely of the beam and constituting a multiple projection system projecting a plurality of images of the light source over the area of the filter, the gate being situated in a plane transverse of the beam removed from a focal plane thereof whereby the illumination and the gate will be uniform.

5. In a projector, a projection gate, a projection objective in front of said gate, a filter comprising vertical color bands also in front of the gate and associated with said objective, a vertically banded light source behind the gate and positioned to throw a beam of light in a path through said gate, objective and filter, a condensing system in said path between the lamp and the gate and including a series of lens elements transversely of the beam and constituting a multiple projection system projecting a plurality of small images of the banded light source over the several filter bands, whereby any unevenness of the light source will affect each filter band to the same extent.

6. In a projector, a projection gate, a projection objective in front of said gate, a filter comprising color sections also in front of the gate and associated with said objective, a light source behind the gate and positioned to throw a beam of light in a path through said gate, objective and filter, a condensing system in said path between the lamp and the gate and including a series of lens elements transversely of the beam and constituting a multiple projection system projecting a plurality of images of the light source over the area of the filter, and means for rotating said series of lens elements.

Signed at Rochester, New York, this 6th day of May, 1927.

JOSEPH MIHALYI.